United States Patent
Maness

[19]

[11] Patent Number: 6,124,662
[45] Date of Patent: Sep. 26, 2000

[54] ACTUATOR USING ELECTRICAL CONTACTS PRESSED IN ABUTMENT

[76] Inventor: Richard Maness, 1002 Rocky Knob Rd., Finger, Tenn. 38334

[21] Appl. No.: 09/274,027

[22] Filed: Mar. 22, 1999

[51] Int. Cl.[7] ................................................. H02N 10/00
[52] U.S. Cl. ............................ 310/307; 310/306; 318/117
[58] Field of Search .......................... 310/307, 31, 306; 335/95, 97, 98; 60/528; 318/117; 322/2 A

[56] References Cited

U.S. PATENT DOCUMENTS

| | | | |
|---|---|---|---|
| 2,063,705 | 12/1936 | Smulski | 60/527 |
| 2,869,045 | 1/1959 | Stephenson | 361/189 |
| 3,184,622 | 5/1965 | Levine | 310/30 |
| 4,811,564 | 3/1989 | Palmer | 340/870.17 |
| 4,932,429 | 6/1990 | Watanabe et al. | 137/62 |
| 5,211,371 | 5/1993 | Coffee | 251/11 |
| 5,389,072 | 2/1995 | Imran | 604/95 |

*Primary Examiner*—Nick Ponomarenko
*Assistant Examiner*—Guillermo Perez
*Attorney, Agent, or Firm*—Glassman, Jeter, Edwards & Wade

[57] ABSTRACT

An actuator for selectively exerting a force responsive to an increase or decrease in applied electrical energy, including an electrically conductive member slideably seated within an electrically non-conductive frame, a thermally responsive and electrically conductive shape memorizing spring seated within the frame and adjacent to the member for urging the member responsive to the passage of electrical current through the shape memorizing spring. An electrically conductive contact strip is connected to the frame and extends therefrom in contact with the member such that movement of the member from the neutral position toward an optimal position will maintain the member in contact with the contact strip and wherein movement of the member to the optimal position will disconnect the member and the contact strip. A power source for generating energy is electrically connected to the contact strip and to the shape memorizing spring whereby a circuit is formed when the member is in contact with the contact strip. A thermally non-responsive spring is seated within the frame for urging the member toward the thermally responsive shape memorizing spring.

25 Claims, 3 Drawing Sheets

ACTUATOR USING ELECTRICAL CONTACTS PRESSED IN ABUTMENT

FIELD OF THE INVENTION

The present invention relates to the field of actuators and more specifically to spring operated actuators. More particularly, the present invention relates to spring operated actuators wherein the spring is composed of an electrically conductive and thermally responsive shape memorizing alloy such as, but not limited to, nickel titanium.

BACKGROUND OF THE INVENTION

Memory metal actuators have been used in industry for some time and are described in the following patents:

| U.S. PAT. NO. |    | NAME OF INVENTOR  |
|---------------|----|-------------------|
| 5,317,612     | to | Bryan, et al      |
| 5,211,371     | to | Coffee            |
| 4,984,542     | to | Riche, et al      |
| 4,836,496     | to | Abujudom, et al   |
| 4,811,564     | to | Palmer            |
| 4,687,315     | to | Fujii             |
| 4,559,512     | to | Yaeger, et al     |
| 4,551,975     | to | Yamamoto, et al   |
| 4,523,605     | to | Ohkata            |
| 4,284,235     | to | Diermayer, et al  |
| 3,248,893     | to | McLane            |

The foregoing patents generally utilize memory metals in a known fashion, that is passing an electrical current through a shape memorizing spring causing the shape memorizing spring to heat up and expand thus creating movement within the actuator. The problem faced by many memory metal actuators is that for the current to pass through the shape memorizing spring, there must be an unbroken electrical current, a part of which includes the shape memorizing spring. The inclusion of the shape memorizing spring in the circuit creates difficulty when the shape memorizing spring expands as those portions of the circuit to which the shape memorizing spring is connected tend to move back and forth with the expansion and contraction of the shape memorizing spring. Such expansion and contraction of the shape memorizing spring tends to cause flexion, bending and twisting at the point where the shape memorizing spring is connected to other members forming the electrical circuit. Such other members can be wiring and/or the intended item being moved by the shape memorizing spring. It has been the experience of this inventor that the expansion and contraction of the shape memorizing spring will cause the connection between the shape memorizing spring and the other components of the circuit to crimp and break.

Another problem faced by memory metal actuators is that it is difficult to monitor the exact expansion of the shape memorizing spring relative to a specific electrical current passing therethrough. A spike of electrical current may cause the shape memorizing spring to hyper-extend causing damage to the shape memorizing spring and further overextending the movement of the member urged by the shape memorizing spring. In some applications, the actuator may be required to extend from a neutral to an optimal position at which point further extension is not necessary or is unwanted. It is not sufficient to simply block the expansion of the shape memorizing spring as the continual application of current to the shape memorizing spring in a fixed position, could overheat and damage the integrity of the spring. What is needed is an actuator using a shape memorizing spring, that will limit the movement of the shape memorizing spring without causing the shape memorizing spring to overheat.

SUMMARY OF THE INVENTION

It is the object of the present invention to provide a memory metal actuator having no fixed connection points between the shape memorizing spring and other components within the invention which form an electrical circuit with the shape memorizing spring.

A further object of the invention is to provide a memory metal actuator wherein the expansion of the shape memorizing spring can be limited without overheating the shape memorizing spring.

A further object of the invention is to provide apparatus for selectively limiting the movement of a member urged by the shape memorizing spring at a predetermined optimal position.

Each of the foregoing objects and other advantages are accomplished in my invention through the use of an electrically non-conductive frame having an elongated member slideably mounted therein. A generator or other source of producing electrical current is connected to a thermally responsive shape memorizing spring seated within the frame, adjacent to but not connected to the slidable member. Portions of the slidable member and the entire shape memorizing spring are electrically conductive. A metal strip is electrically connected to the generator or other electrical source and is in biased contact with the slidable member when the slidable member is in a neutral position. The generator, strip, member and shape memorizing spring form an electrical circuit through which electrical current generated by the generator may pass thus causing the shape memorizing spring to expand responsive to an increase in temperature. This expansion urges the member from the neutral position to an optimal position within the frame.

A thermally non-responsive spring is seated within the frame opposite the shape memorizing spring to urge the member to said neutral position when no current is passing through the shape memorizing spring. The metal strip is disposed relative to the slidable member such that movement of the slidable member through the optimal position will move the member out of contact with the strip thus breaking the circuit and terminating the flow of electricity through the shape memorizing spring. As the current dissipates, the shape memorizing spring returns to its original position allowing the thermally non-responsive spring to urge the member toward the neutral position. As the member again contacts the strip the current is re-established causing the shape memorizing spring to again expand.

The result is microscopic vacillation of the member away from and against the strip that causes the member to remain substantially stationery in the optimal position. Of course, if the electrical current is permanently terminated, the shape memorizing spring will contract to its original position thus allowing the thermally non-responsive spring to urge the member to the neutral position.

BRIEF DESCRIPTION OF THE DRAWINGS

An actuator embodying features of my invention is depicted in the accompanying drawings which form a portion of this disclosure and wherein.

DESCRIPTION OF PREFERRED AND ALTERNATE EMBODIMENTS OF THE PRESENT INVENTION

Figure 1:
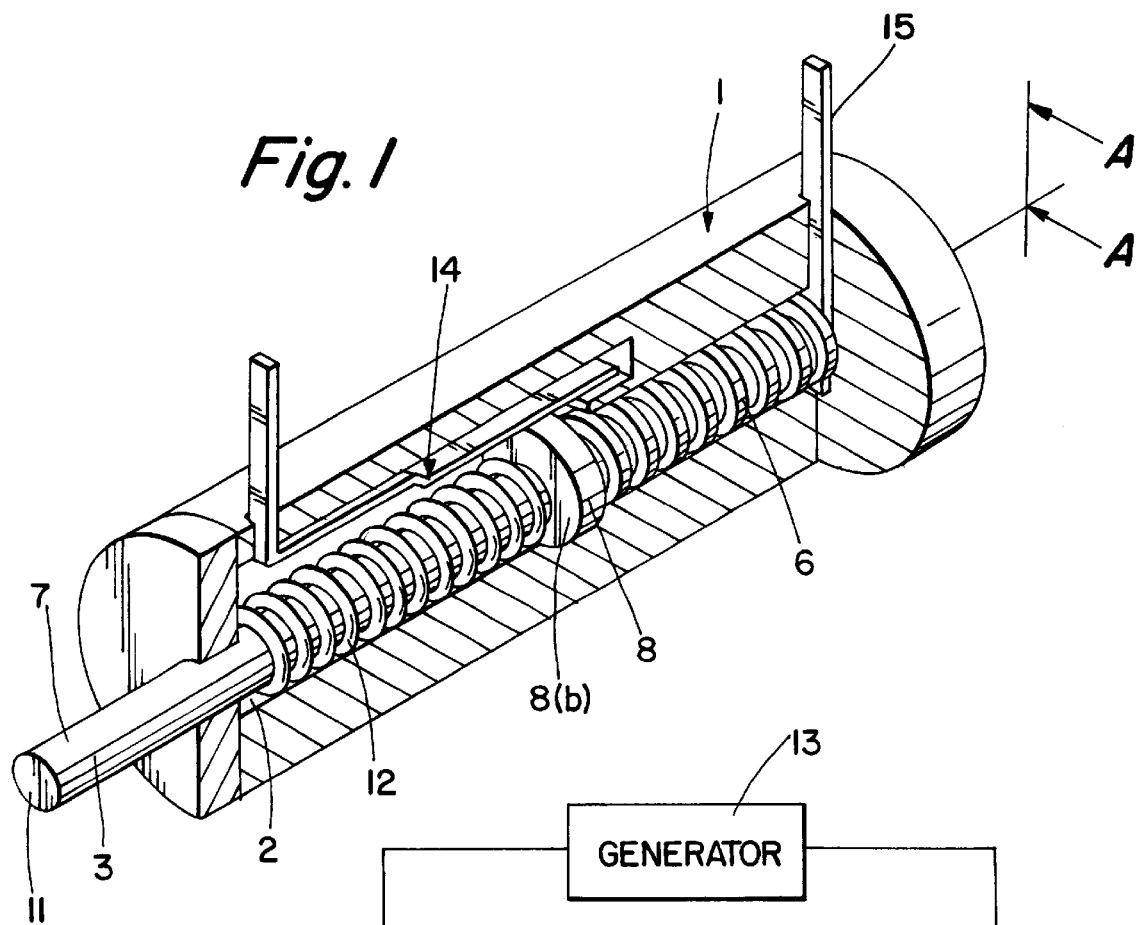
FIG. 1 is a perspective broken away view of the preferred embodiment of the present invention.

Referring to the drawings for a clearer understanding of the invention, it may be seen from FIG. 1 that the preferred embodiment of the present invention includes a frame 1. The frame 1 defines an interior slide chamber 2 in which an elongated member 3 is seated for sliding movement within and extension from the frame 1. The frame 1 further defines an aperture 4 through which the member 3 extends. Note that the frame 1 is constructed of an electrically non-conductive material such as but not limited to plastic or ceramic.

A thermally responsive and electrically conductive shape memorizing spring 6 is seated within the frame 1 and within said slide chamber 2 adjacent but in disconnected relation to the member 3. The member 3 includes an electrically non-conductive elongated rod 7, having a first external diameter, and a electrically conductive press plate 8 connected to a first end 9 of the elongated rod 7. A second end 11 of the elongated rod 7 is defined opposite the press plate 8 and extends from the aperture 4. The press plate 8 is connected to the elongated rod 7 in coaxial relation thereto and defines a second external diameter larger than the first external diameter defined by rod 7. The press plate 8 also defines a first contact surface 8(a) and a second contact surface 8(b) opposite said first contact surface 8(a).

Figure 2:
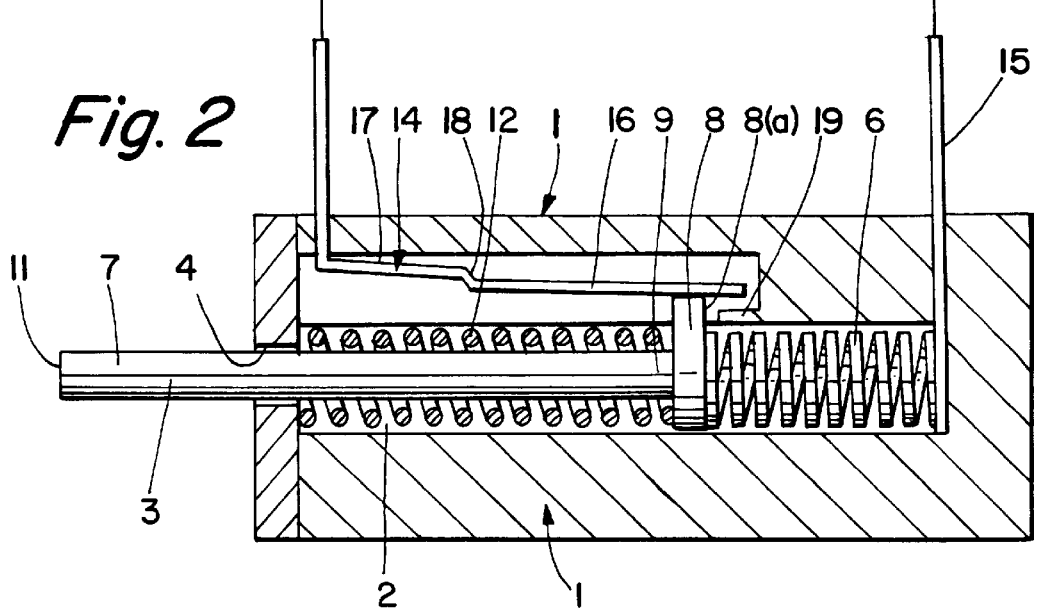
FIG. 2 is a sectional view taken along line A—A of FIG. 1 showing the preferred embodiment of the present invention with the elongated member in the neutral position.
Figure 3:
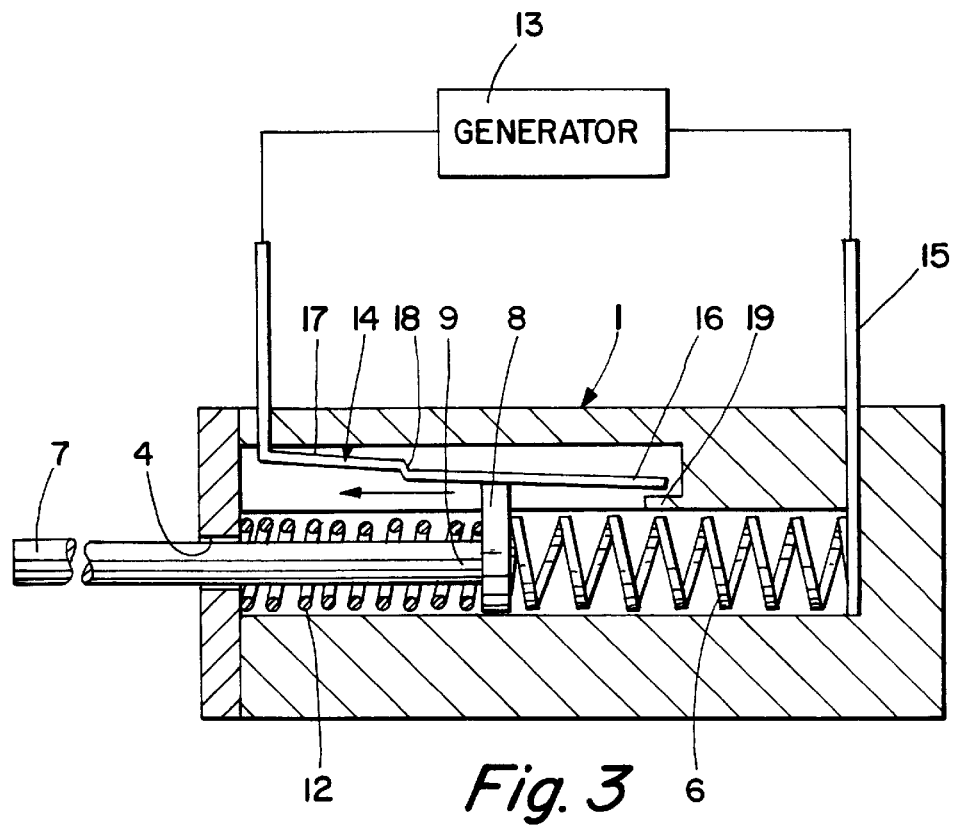
FIG. 3 is a sectional view of the preferred embodiment of the present invention showing the elongated member in phantom while moving from a neutral position to an optimal position.

The member 3 is held in pressed abutment with the shape memorizing spring 6 by a thermally non-responsive spring 12 seated within the slide chamber 2 opposite the shape memorizing spring 6 and in pressed but disconnected abutment with the second contact surface 8(a). As is shown in FIG. 2, a generator 13 or other power source for generating an electrical current is conductively but not physically connected to the shape memorizing spring 6 by the use of a conductive strip 14 seated within the frame 1 adjacent to but not physically connected to the shape memorizing spring 6. In turn, a conducting element 15 is connected to the generator 13 and extends within the frame 1 proximate the shape memorizing spring 6. The shape memorizing spring 6 is positioned in pressed but disconnected abutment with the conducting element 15. The stiff but elastic and electrically conductive strip 14 is mounted to the frame 1 and extends within the slide chamber 2. A second portion 16 of the strip 14 is in pressed abutment with the member 3 and more specifically, with a radially disposed edge of the press plate 8 when the member 3 is in a neutral position (as is shown in FIG. 2). and when the member 3 is urged from the neutral position toward an optimal position (as is shown in FIG. 3), the strip 14 is connected to the generator 13 such that the generator 13, the shape memorizing spring 6, the press plate 8, the conducting element 15 and the strip 14 form an electrical circuit when the strip 14 is in contact with the press plate 8.

In operation the generator 13, which may include any electrical power source such as a battery, external alternating current supply or internal generator, will provide an electrical current which will pass through the conducting element 15, the shape memorizing spring 6, the press plate 8, and the strip 14. The shape memorizing spring 6 is constructed of nickel titanium, Tinel® or any other conductive shape memorizing alloy commonly known in the industry. As the electrical current passes through the shape memorizing spring 6, the thermally responsive shape memorizing spring 6 will expand thus exerting a force against the member 3 and indirectly against the thermally non-responsive spring 12 to urge the member 3 from the neutral position shown in FIG. 2 and toward an optimal position shown in FIG. 4.

The strip 14 comprises a first portion 17 positioned a predetermined distance from said member 3 and extending from the frame 1 toward the member 3. The strip 14 further comprises a crimped portion 18 connected to the first portion 17 and disposed in angular extension therefrom toward said member 3. The second portion 16 is connected to the crimped portion 18 opposite the first portion 17 and extends therefrom in substantially parallel relation thereto. The second portion 16 extends in substantially parallel relation to the member 3 and in biased abutment with the press plate 8 when the member 3 is moving from the neutral position shown in FIG. 2 toward the optimal position shown in FIG. 4.

Figure 4:
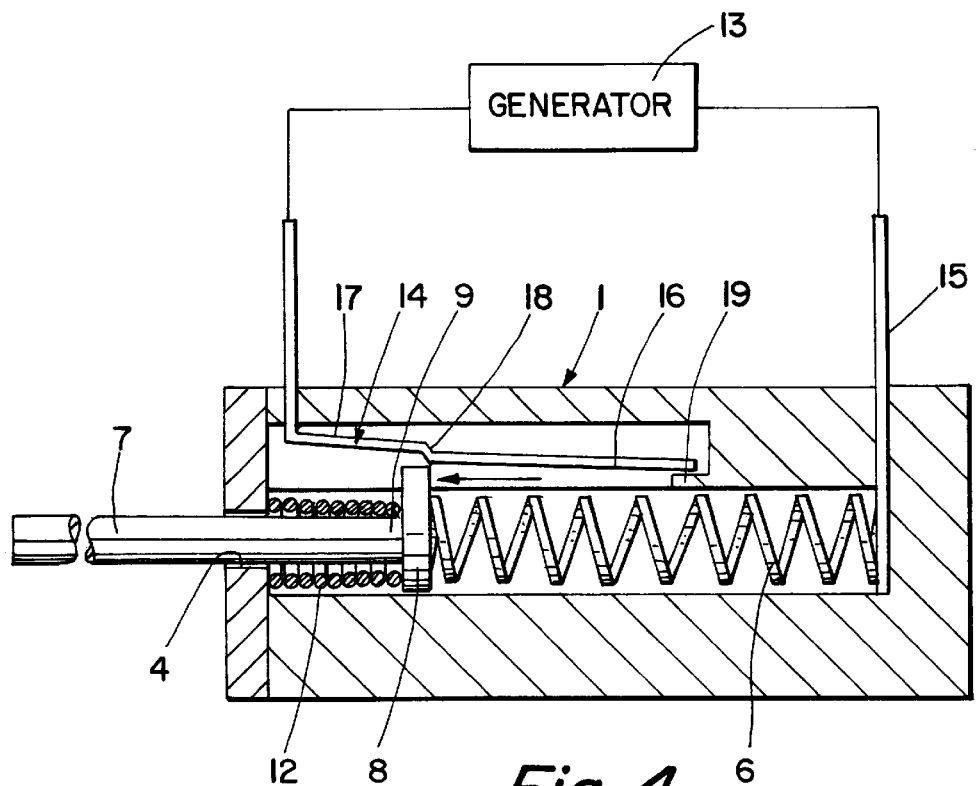
FIG. 4 is a sectional view taken along line A—A of the preferred embodiment of the present invention showing the elongated member in the optimal position.

As the press plate 8 is urged by the shape memorizing spring 6 to the optimal position shown in FIG. 4 the press plate 8 passes from beneath the second portion 16 of the strip 14 and beneath the first portion 17 of the strip 14. As the first portion 17 is positioned a distance from the member 3, movement of the member 3 to the optimal position shown in FIG. 4 will move the member 3 out of contact with the strip 14 thus terminating flow of current through the shape memorizing spring 6. The frame 1 defines a flange 19 for limiting the movement of the strip 14 toward the member 3 to insure that the second portion 16 and the member 3 do not contact.

The shape memorizing spring 6 begins to cool and contract whereupon the force exerted by the thermally non-responsive spring 12 urges the member 3 toward the neutral position. As the press plate 8 again comes in contact with the second position 16 the current is re-established, the shape memorizing spring 6 is reheated and expands to again urge the member 3 toward the optimal position.

As long as electrical current is produced by the generator 13 the member 3 will make microscopic vacillations in close proximity to the optimal position. If the generator 13 is switched off or otherwise electrically disconnected from the shape memorizing spring 6, the shape memorizing spring 6 will cool and contract allowing the thermally non-responsive spring 12 to urge the member 3 to the neutral position.

It should be clear that the present invention allows the use of a shape memorizing spring 6 to urge the member 3 to an optimal position and to facilitate the return of the member 3 to a neutral position without physically connecting the memory metal spring to any other component of the invention. In addition, the generator 13 may operate continually without the risk of overheating the shape memorizing spring 6.

Figure 5:
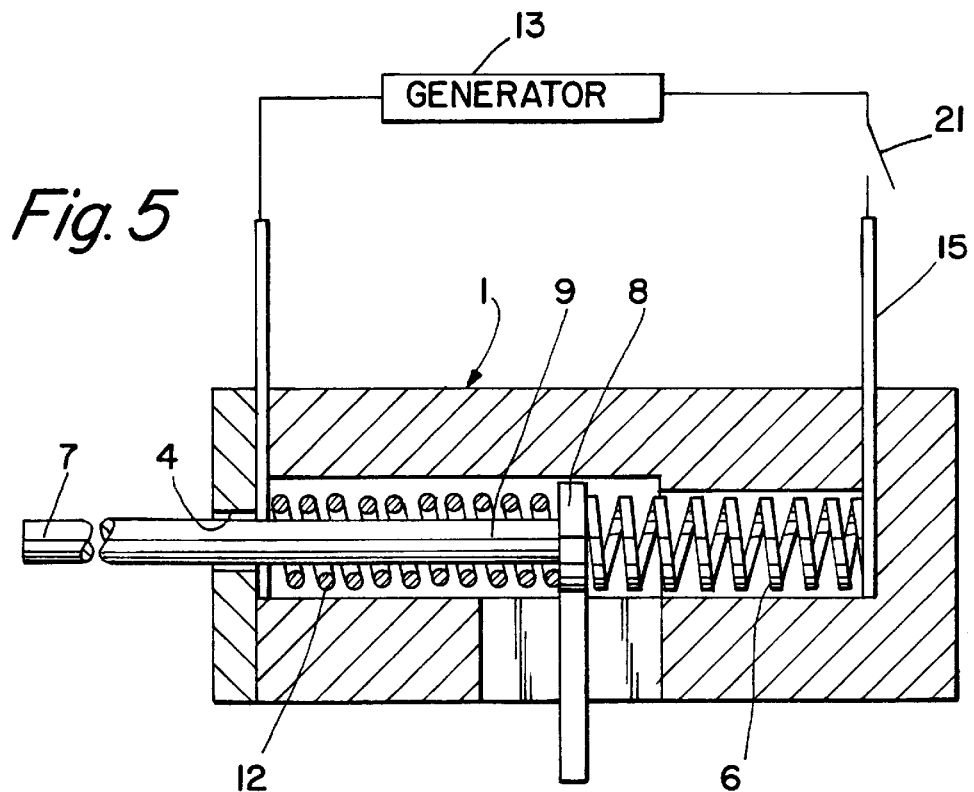
FIG. 5 is a sectional view of a second embodiment of the present invention.
Figure 6:
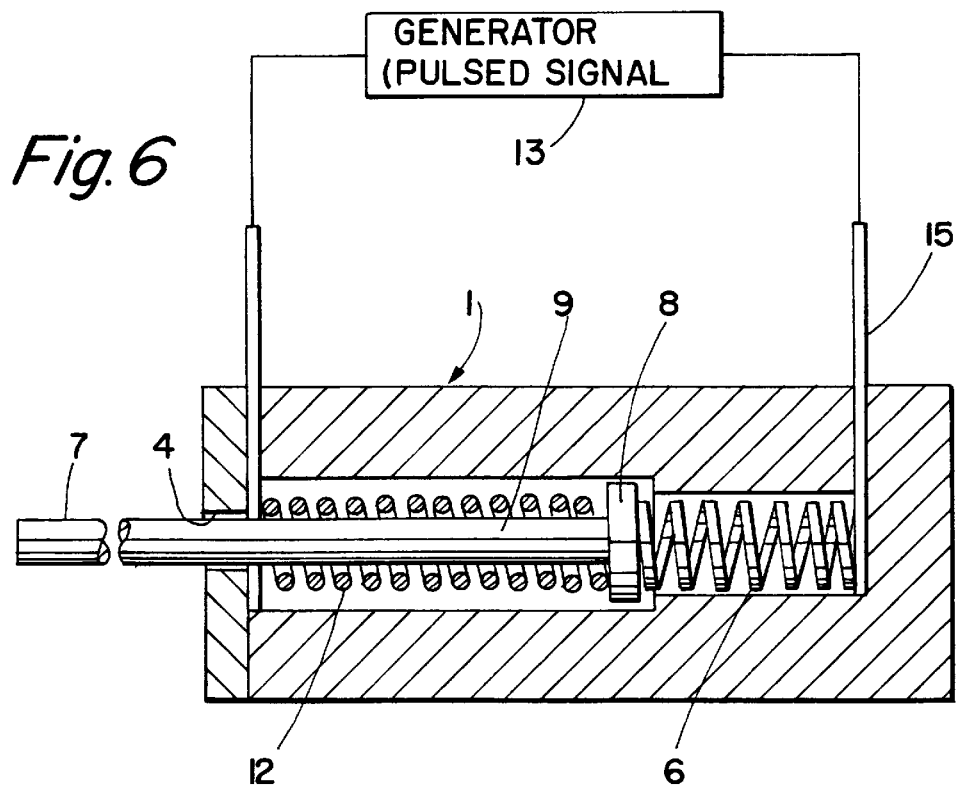
FIG. 6 is a sectional view of a third embodiment of the present invention.

A second embodiment of the present invention is shown in FIG. 5. A third embodiment of the present invention is shown in FIG. 6. In both the second and third embodiment, the strip 14 has been eliminated and the thermally non-responsive spring 12 has been conductively connected to the generator 13. Though the spring 12 is thermally non-responsive, it is electrically conductive such that current may pass through the shape memorizing spring 6, the press plate 8 and the thermally non-responsive spring 12.

In the third embodiment, the generator is of a type commonly known in the industry for generating a pulsed signal. A pulsed signal is utilized to prevent the shape memorizing spring from overheating.

The third embodiment of the present invention includes a manual switch 21 for selectively connecting and disconnecting the electrical circuit formed by the generator 13, spring 6, spring 12 and press plate 8.

In both the second and third embodiments, the flange 19 previously shown in the preferred embodiment (see FIGS. 2 through 4), has been removed as the necessity of maintaining the strip 14 at a predetermined distance from the press plate 8 is no longer required. In operation, the second and third embodiments work much as the same as that previously described in the first embodiment with the primary advantage to the invention being the use of an electrically responsive shape memorizing spring 6 which is not physically connected to other component parts of the invention, but effectively urges the member 3 to and from a neutral and optimal position.

While I have shown my invention in several forms, it will be obvious to one skilled in the art that it is not so limited but is susceptible to various changes and modifications without departing from the spirit thereof.

What I claim is:

1. An Actuator for selectively exerting a force responsive to an increase or decrease in applied electrical energy, comprising;
   a. an electrically conductive member slideably seated within an electrically non-conductive frame;
   b. a thermally responsive shape memorizing spring seated within said frame and adjacent to said member for urging said member responsive to the passage of electrical current through said shape memorizing spring;
   c. means for generating an electrical current conductively connected to said shape memorizing spring; and
   d. electrical contact means conductively connected to said generating means and biased in pressed but unconnected abutment with said member thus creating an electrical circuit through which an electrical current is passed through said shape memorizing spring to cause said shape memorizing spring to expand and thereby urge said member, wherein said contact means includes a first portion connected to said frame and extending therefrom toward said member, a crimped portion connected to said first portion in angular relation thereto, and a second portion connected to said crimped portion opposite said first portion and in substantially parallel relation thereto, wherein said second portion extends in biased abutment with said member and wherein movement of said member past said second portion will space said member from said contact means.

2. An actuator as described in claim 1 wherein said member comprises,
   a. an electrically non-conductive elongated rod defining a first end, a second end and a first external diameter; and
   b. an electrically conductive press plate connected to said first end of said elongated rod in coaxial relation thereto and defining a second external diameter larger than said first external diameter of said rod.

3. An actuator as described in claim 2 wherein said electrical contact means is biased in pressed but unconnected abutment with a radially disposed edge of said press plate.

4. An actuator as described in claim 2 wherein said press plate defines a first contact surface adjacent to and in pressed but disconnected abutment with said shape memorizing spring.

5. An actuator as described in claim 4 wherein said press plate defines a second contact surface opposite said first contact surface.

6. An actuator as described in claim 5 comprising means seated within said frame for urging said member towards said shape memorizing spring.

7. An actuator as described in claim 5 wherein urging means comprises a thermally non-responsible spring seated within said frame opposite said shape memorizing spring and in pressed and disconnected abutment with said second contact surface.

8. An actuator as described in claim 2 comprising means seated within said frame for urging said member towards said shape memorizing spring.

9. An actuator as described in claim 8 wherein said urging means comprises a thermally non-responsive spring seated within said frame opposite said shape memorizing spring and in pressed but disconnected abutment with said press plate.

10. An actuator as described in claim 1 comprising means seated within said frame for urging said member towards said shape memorizing spring.

11. An actuator as described in claim 1 wherein said shape memorizing spring comprises a nickel titanium alloy.

12. An actuator as described in claim 1 wherein said shape memorizing spring is mounted in pressed but disconnected abutment with said member.

13. An actuator as described in claim 1 wherein said frame comprises means for limiting the movement of said contact means towards said member.

14. An actuator as described in claim 1 wherein said generator emits a pulsed electrical signal.

15. An actuator comprising,
   a. a frame;
   b. an electrically conductive member seated within said frame for sliding movement therein;
   c. an electrically conductive and thermally responsive shape memorizing spring seated within said frame in adjacent but disconnected relation to said member for urging said member from a neutral position to an optimal position, wherein passage of an electrical current through said shape memorizing spring will heat said shape memorizing spring and cause said shape memorizing spring to expand thereby urging said member from said neutral position to said optimal position; and
   d. a conducting element connected to a power source and mounted within said frame opposite said electrically conductive member and in pressed but disconnected abutment with said shape memorizing spring for conducting electrical energy to said shape memorizing spring.

16. An actuator as described in claim 15 further comprising contact means connected to said frame and in pressed abutment with said member for automatically terminating said electrical current through said shape memorizing spring when said member is urged from said frame to said optimal position.

17. An actuator as described in claim 16 wherein said contact means comprises a strip of metal extending in contact with said member when said member is in said neutral position and during movement of said member from said neutral position toward said optimal position such that movement of said member past said optimal position will move said member out of contact with said strip.

18. An actuator as described in claim 17 further comprising means for urging said member from said optimal position towards said neutral position.

19. An actuator as described in claim 15 further comprising means for urging said member from said optimal position towards said neutral position.

20. An actuator as described in claim 19 wherein said urging means comprises a thermally non-responsive spring seated within said frame opposite said shape memorizing spring and conductively but not physically connected to a means for generating electrical power, wherein said thermally non-responsive spring is seated in pressed but disconnected contact with said member.

21. An actuator as described in claim 15 comprising a switch conductively connected to said shape memorizing spring for selectively terminating said electrical current there through.

22. An actuator as described in claim 21 wherein said electrical current comprises a pulsed signal.

23. An actuator for selectively exerting a force responsive to an increase or decrease in applied electrical energy, compromising;

a. a frame;

b. a member slideably seated within said frame;

c. a generator for producing electrical current;

d. a conductive element connected to said generator and mounted to said frame, wherein a shape memorizing spring is seated within said frame between said member and said conducting element and in pressed but disconnected abutment with both said member and said conducting element.

24. An actuator as described in claim 23 further comprising electrical contact means conductively connected to said generator and mounted to said frame in pressed but disconnected abutment with said member when said member is positioned in a neutral position and when said member is moved from said neutral position to an optimal position but wherein the movement of said member past said optimal position will space said member from said contact means.

25. An actuator as described in claim 24 wherein contact means comprises, a. a first portion connected to said frame and extending therefrom toward said member;

b. a crimped portion connected to the said first portion in angular relation thereto; and c. a second portion connected to said crimped portion opposite said first portion and in substantially parallel relation thereto, wherein said second portion extends in substantially parallel relation to and biased abutment with said member and wherein movement of said member past said second portion will space said member from said contact means.

* * * * *